United States Patent
Bonilla Benegas

(10) Patent No.: US 9,833,928 B2
(45) Date of Patent: Dec. 5, 2017

(54) AUTOMATIC SYSTEM FOR MONITORING THE MIXING OF CONGLOMERATES

(75) Inventor: Eugenio Bonilla Benegas, Madrid (ES)

(73) Assignees: Antonio Ozàmiz Tapia, Madrid (ES); Javier Ozàmiz Tapia, Madrid (ES)

( * ) Notice: Subject to any disclaimer, the term of this patent is extended or adjusted under 35 U.S.C. 154(b) by 801 days.

(21) Appl. No.: 12/085,471

(22) PCT Filed: Nov. 17, 2006

(86) PCT No.: PCT/ES2006/000639
§ 371 (c)(1),
(2), (4) Date: May 23, 2008

(87) PCT Pub. No.: WO2007/060272
PCT Pub. Date: May 31, 2007

(65) Prior Publication Data
US 2009/0171595 A1    Jul. 2, 2009

(30) Foreign Application Priority Data
Nov. 28, 2005    (ES) .................................. 200502936

(51) Int. Cl.
*G01L 1/00*    (2006.01)
*B28C 7/02*    (2006.01)
(Continued)

(52) U.S. Cl.
CPC .......... *B28C 7/02* (2013.01); *B01F 15/00207* (2013.01); *B01F 15/00246* (2013.01);
(Continued)

(58) Field of Classification Search
CPC ....................................................... B28C 7/02
(Continued)

(56) References Cited

U.S. PATENT DOCUMENTS 3,382,724 A * 5/1968 Wilcox ...................... 73/514.29
3,640,121 A * 2/1972 Mercier ................. G01N 33/26
73/433
(Continued)

FOREIGN PATENT DOCUMENTS

EP    924040 A1 * 6/1999
EP    0924040 A1 * 6/1999 ............. B28C 7/024
(Continued)

OTHER PUBLICATIONS

All About Circuits, "Strain gauges," (2003).*

*Primary Examiner* — Hyun Park

(57) ABSTRACT

The invention relates to an automatic system for monitoring the mixing of conglomerates. The inventive system can be used to monitor and measure the volume of a conglomerate, i.e. a concrete, mortar or other similar product, and the conditions in which the conglomerate is being mixed inside a mixer. The invention is characterized in that the system is provided with a sensor which rotates integrally with the mixer and which is fitted with a blade that is sensitive to the stresses exerted by the conglomerate thereon. The invention is also characterized in that the aforementioned information is transmitted to one or more terminals, by means of radio communication or other similar wireless communication means, for use in industrial processes.

23 Claims, 5 Drawing Sheets

(51) Int. Cl.
  *B01F 15/00* (2006.01)
  *B28C 5/42* (2006.01)
  *B60P 3/16* (2006.01)
  *G08G 1/00* (2006.01)

(52) U.S. Cl.
  CPC ............... *B28C 5/422* (2013.01); *B60P 3/16* (2013.01); *G08G 1/20* (2013.01)

(58) Field of Classification Search
  USPC .......................................................... 702/41
  See application file for complete search history.

(56) References Cited

U.S. PATENT DOCUMENTS

| | | | |
|---|---|---|---|
| 4,327,437 A * | 4/1982 | Frosch et al. ...................... | 714/3 |
| 4,337,516 A * | 6/1982 | Murphy et al. ............... | 702/183 |
| 5,713,663 A | 2/1998 | Zandberg et al. | |
| 5,844,152 A * | 12/1998 | Lambert ................ | G01N 11/10 73/54.41 |
| 6,227,039 B1* | 5/2001 | Te'eni .......................... | 73/54.03 |
| 2002/0032517 A1 | 3/2002 | Buckelew et al. | |
| 2004/0039510 A1* | 2/2004 | Archer ................... | A62C 27/00 701/48 |
| 2004/0143478 A1* | 7/2004 | Ward ..................... | G06Q 30/02 705/7.32 |
| 2005/0152432 A1* | 7/2005 | Hakimuddin ............ | G01N 3/00 374/53 |
| 2007/0046479 A1* | 3/2007 | Hines ................. | G01N 29/2462 340/584 |
| 2007/0185636 A1* | 8/2007 | Cooley et al. .................. | 701/50 |

FOREIGN PATENT DOCUMENTS

| | | |
|---|---|---|
| GB | 2329027 A | 3/1999 |
| GB | 2392502 A | 3/2004 |

* cited by examiner

US 9,833,928 B2

AUTOMATIC SYSTEM FOR MONITORING THE MIXING OF CONGLOMERATES

CROSS-REFERENCE TO RELATED APPLICATIONS

Apr. 13, 2001: U.S. Pat. No. 6,484,079 B2 (also US20020032517) (BUCKELEW, et al).

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The present invention is intended for the sector relating to the manufacture, transportation and distribution of products such as concrete, cement mortar, lime mortar or any similar product. Below this entire family of products shall be called "concrete mixes", namely, masses formed by fragments of rocks, sand and/or other substances, which may be mixed with bonding materials, which may be dry-mixed or wet-mixed with water and/or additives and which may be subject to chemical/physical conditions which may cause them to set after a given period of time has lapsed.

Concrete mixes are usually supplied in metered amounts, premixed in specialized factories and transported under given mixing conditions in concrete-mixer lorries. These lorries act as moving mixers from the moment they are filled at the production plant until delivery at the site.

For quality control of the product it is very important to monitor that the concrete mixes are transported under the appropriate conditions which ensure that they are correctly mixed by means of mixing in the mixer. If the revolving drum of the lorry does not rotate sufficiently rapidly, the components which form the mix will separate, with the result, for example in the case of concrete, that the stones remain at the bottom, the cement and fines remain in the middle and the water remains at the top, inside the revolving drum, with the consequent negative effect on the product.

With the present invention it is possible to know at all times the conditions in which the concrete mix is being loaded, mixed, transported and delivered to the customer, as well as to obtain information about its plasticity. It is possible to monitor the number of revolutions at which the concrete mix has travelled whilst being mixed continuously during charging, transportation and discharging. Information is provided regarding the plasticity of the transported concrete mix.

Moreover it is possible to obtain at any time a measurement of the volume transported. A great novelty of the present invention is that, as a result thereof, it is able to provide the customer with the means for knowing the volume and the plasticity of the concrete mix of each lorry arriving. The reality today is that in most cases the customer does not have the means for being able to measure whether the volume of concrete ordered is being delivered. By means of the present invention it is possible to do this.

And, finally, it provides a means for automatically identifying the lorry in those locations where it is desired to record such information.

Description of Related Art Including Information Disclosed Under 37 CFR 1.97 and 1.98

U.S. Pat. No. 6,484,079
Inventors: Buckelew, Richard A. (Bradenton, Fla.); Goff, Ken (Sarasota, Fla.).
Owner: RMC Industries Corporation, USA ("RMC").
Description: An already patented system which monitors the speed of rotation of the revolving drum, its direction of rotation and the plasticity of the concrete mix, using the conventional technologies described.

BRIEF SUMMARY OF THE INVENTION

This patent application discloses an autonomous system that provides to anyone interested, and in particular a customer, wireless digital measurement of the volume and plasticity of a conglomerate, such as concrete, which being mixed on the revolving drum of a mixer; monitoring the entire life-cycle of the mixing process of said conglomerate.

The reality today is that in most cases the customer does not have the means for being able to measure whether the volume of concrete ordered is being delivered. By means of the present invention it is possible to do this. A great novelty of the present invention is that, as a result thereof, it is able to provide the customer with the means for knowing the volume and the plasticity of the concrete mix of each lorry arriving.

BRIEF DESCRIPTION OF THE SEVERAL VIEWS OF THE DRAWING(S)

FIG. 1 shows a concrete mixing transport truck in which the sensor of the system object of this invention is installed. This sensor is measuring the direction of rotation of the mixer, the speed of rotation of the mixer, the volume of concrete mix which is being mixed and the plasticity of said concrete mix; said sensor sending all this information, along with a code that identifies the sensor, to a mobile equipment that a user has in hand.

Figure 11:
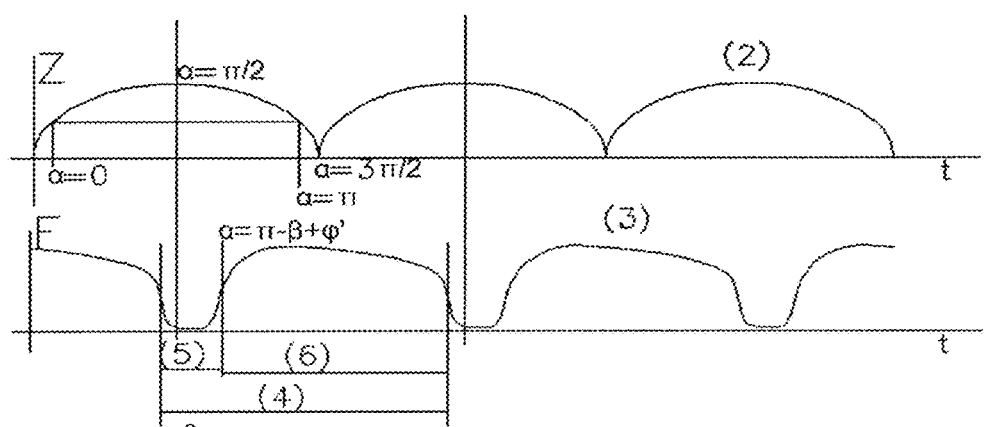

In FIG. 11 two graphs are represented, the top graph with the tune in the axis of abscissas and the position of the z axis of the sensor in the axis of ordinates; And the inferior graph with the time in the axis of abscissa and the effort in the palette in the axis of ordinates.

Figure 12:
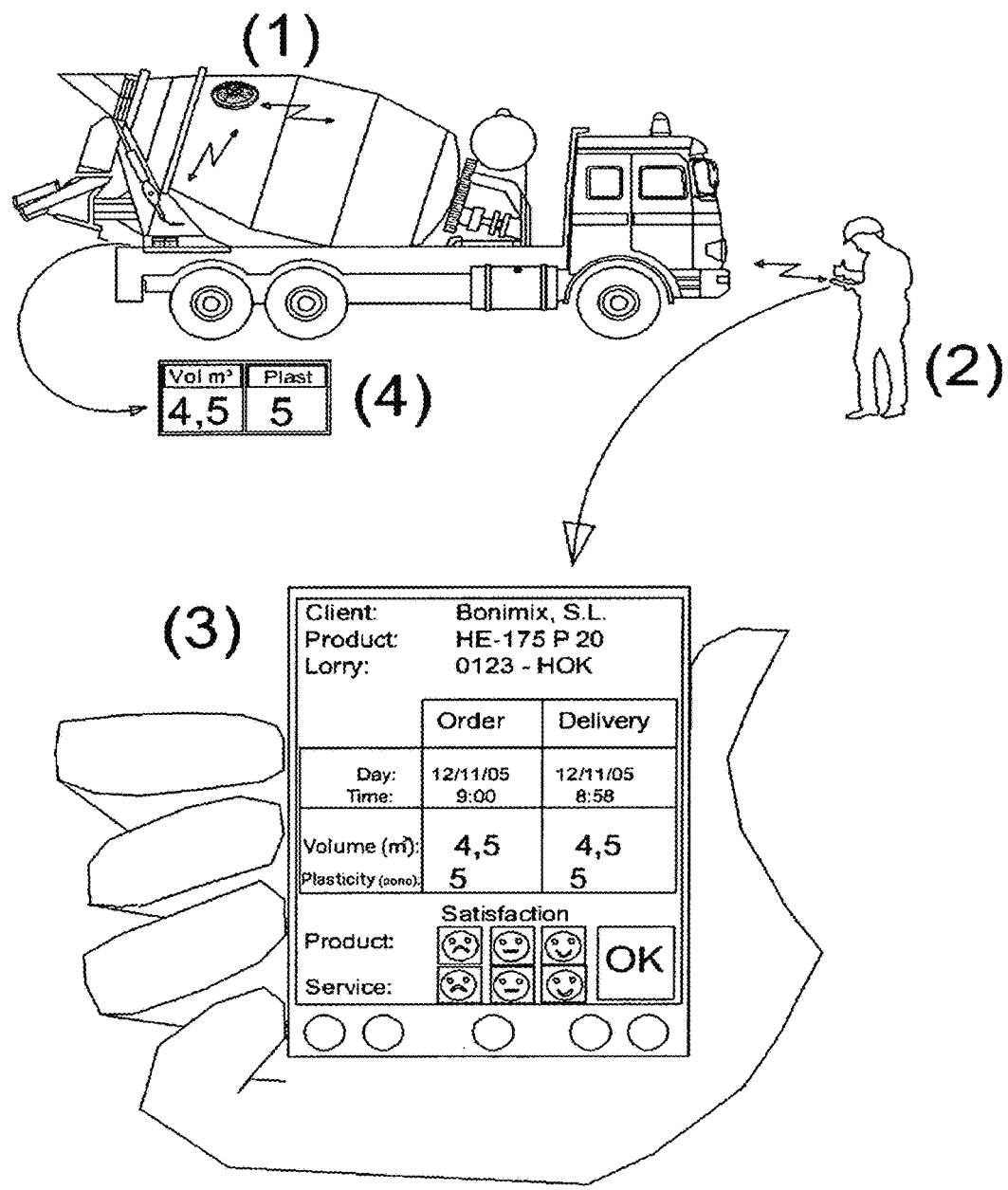

FIG. 12 shows a possible operation of this system, in which a customer is receiving a concrete mixing transport truck using a PDA mobile terminal that is communicating with the sensor which informs the customer of the volume and plasticity of the concrete inside the mixer said truck.

DETAILED DESCRIPTION OF THE INVENTION

Prior Art

At present systems which allow monitoring of the speed of rotation and direction of rotation of the revolving drum in concrete-mixer lorries are already known, these being based on the positioning of a set of end-of-travel stops on the outside of the drum. These systems are fairly reliable, but they have the drawback that they are only used to perform this function and that it is necessary to install an electrical system connected to the electronic unit which processes the pulse signals in order to convert them into a measurement of the revolutions.

At present systems which allow monitoring of the direction of rotation by means of installation of one or more pressure switches in the hydraulic system of the revolving drum are also known. These systems are fairly reliable, although they have the drawback that they are only used for this function and that it is necessary to perform the hydraulic and electrical installation of the abovementioned devices.

At present systems which allow monitoring of the plasticity or consistency of the concrete mix are also known, the systems being based on the installation of one or more pressure sensors in the hydraulic circuit of the mixer. Depending on the speed at which the revolving drum is rotating and the quantity of concrete mix being transported, it is possible to estimate and implement an algorithm in order to relate the pressure of the sensor to the consistency of the product transported. These systems are not as reliable as the previous systems and, although they fulfil their function, the main drawback which they have is that they do not have a means for determining the volume of concrete transported and that it is necessary to enter said volume in them in order to be able to deduce subsequently the plasticity, as well as the fact that it is required, as in the previous cases, to install one or various pressure sensors in the hydraulic circuit and install an electrical connection from them to the processor.

At present systems which allow automatic identification of the lony entering or leaving an enclosure are also known. There are systems based on automatic reading of the lorry's registration number using a video system and subsequent processing of the video image in order to extract the registration cumber; there are systems based on the use of both active and passive RFID technology. All these systems have their advantages and drawbacks.

At present systems which allow automatic identification of the lorry when it leaves the plant and arrives at the site where the product is to be delivered to the customer are also known. These systems are usually based on the use of GPS technology. By storing the GPS coordinates of the plants and the customer sites and using a radio network system for protection against errors in the GPS signal, it is possible to know whether the lorries are entering or leaving the networks assigned to plants or to the customer sites concerned. The invention according to this patent provides another method for achieving this without access to a GPS system.

At present systems which allow monitoring of the weight of die concrete mix which is being transported in a lorry are also known. This may be performed statically by measuring the differences in weight when the lorry is full and empty using lorry weighbridges. This, however, would not be autonomous and therefore, if what is required is to have an autonomous system on-board the lorry capable of monitoring the weight or volume of concrete transported by the lorry at any one moment, according to conventional technology it is possible to install load cells on the associated lorry, for example above the leaf springs, these being connected to a corresponding weighing terminal installed on the lorry so that the lorry can weigh itself when full and empty and thus determine the weight of its load. The main drawback of this system is its high cost and fragility, which result in it not being viable for the concrete-manufacturing sector.

If we combine the abovementioned systems, it is possible to implement a system which detects automatically the speed of rotation at which the concrete is being mixed, the direction of rotation in order to know whether it is being mixed or discharged and the weight of the concrete transported and, using all this information together with the recorded pressures of the hydraulic circuit which moves the revolving drum of the lorry in both the mixing direction and discharging direction, it is possible to estimate the plasticity or consistency of the concrete mix for the whole period of transportation thereof inside the lorry.

The consistency or plasticity or degree of "tempering" as it is referred to in Latin America is an important characteristic of the concrete mix because it relates to the ease of application and handling thereof on-site. Depending on where the concrete mix is to be deposited, it is advisable that it should have one consistency rather than another. For this reason, it is a characteristic of the product and the customers define which consistency they require when they place an order for concrete. It is very important for the concrete manufacturers to verify correctly that their product has this characteristic, in order to meet the customers' requirements. Normally the production plants have control systems which ensure that the consistency is correct at the time of manufacture. The problem is that this consistency may be altered during transportation if there are no systems such as that described for monitoring it at all times.

The concrete mix is usually purchased by volume in cubic meters and not by weight. This is due to die fact that it is easier for the customer to check the volume purchased rather than the weight. If, for example, a customer needs to build some concrete pillars, he knows beforehand the volume of concrete which will be needed by performing a calculation as to the cubic meterage of his pillars. When the ordered concrete is laid, it should fill the pillars in accordance with his meterage calculations. Doing this by weight is much more complex since the full lorry is weighed upon entering the site and is weighed again when empty upon leaving, in order to subsequently convert the value of the weight into volume and apply the abovementioned cubic meterage methods, with the additional complication that the density of the concrete is only known by the supplier since it depends on the metered amount of concrete and the density of the raw materials forming it. If, moreover, there are no reliable systems for measuring the moisture of the sand used, then this data would also be approximate.

For the concrete manufacturer it is very important to ensure the correct volume of the product being delivered to the customer. If there is a mistake, with a smaller volume being delivered, and the customer lays it in a constructional component with a cubic meterage which can be determined, as for example in the case of pillars, this will give rise to dissatisfaction and complaints on the part of the customer. On the other hand, if too much concrete is delivered, the manufacturer will have increased costs and moreover may incur even more costs if the customer returns the surplus material to them for disposal in a waste tip.

Despite all of the above, the reality of the current situation, considering the application of technology nowadays, is that most of the lorries do not have systems for monitoring the state of the concrete mixes being transported. This is due to the fact that, as described, it is necessary to combine the previous systems, install them and interconnect them; it is also due to the fact that, when the conventional technology described is applied, the equipment to be installed is costly and complicated to install.

By way of example of an already patented system which monitors the speed of rotation of the revolving drum, its direction of rotation and the plasticity of the concrete mix, using the conventional technologies described, it is possible to mention the patent of invention in the name of RMC industries Corporation, USA ("RMC"), with patent number U.S. Pat. No. 6,484,079, and inventors Buckelew, Richard A. (Bradenton, Fla.); Goff, Ken (Sarasota, Fla.). This patent was registered in April 2001 and the reality is that it has been applied to a fairly small number of lorries due to its complexity and cost as regards both installation and exploitation. Moreover, this patent is unable to measure the volume of concrete being transported in the lorry.

DESCRIPTION OF THE INVENTION

Figure 1:
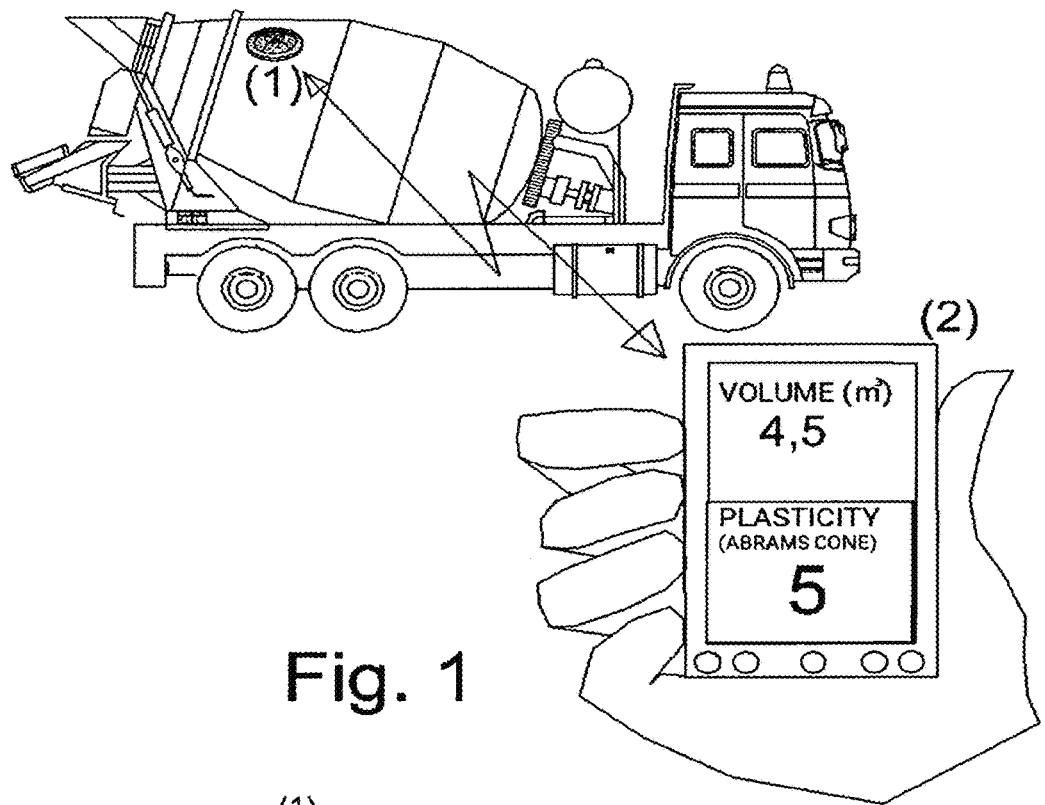

The invention presented here is based on an electronic sensor which is installed integrally with the mixer so that it rotates together therewith, as shown at (1) in FIG. 1. The sensor has a microprocessor which detects, processes and records information from the mixer and transmits it via radio or other equivalent wireless series transmission means to other devices with which it communicates, such as, for example, a mobile handset terminal which a user may have, as shown at (2) in FIG. 1. The sensor has internally a battery supplying electric power which allows it to be autonomous for long periods of time. The invention also considers the possibility of providing the sensor optionally, on the outside thereof, with photovoltaic cells supplying it with electrical energy from the sunlight, thus making it unnecessary to replace the battery since it is recharged when the lorry is in use during the daytime.

Figure 3:
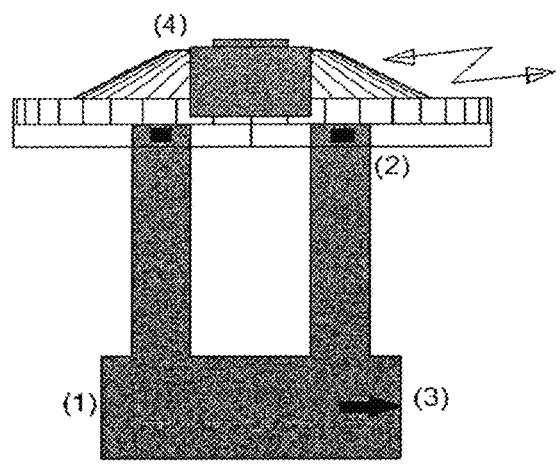
FIG. 3 shows a possible mechanical embodiment of the sensor.
Figure 4:
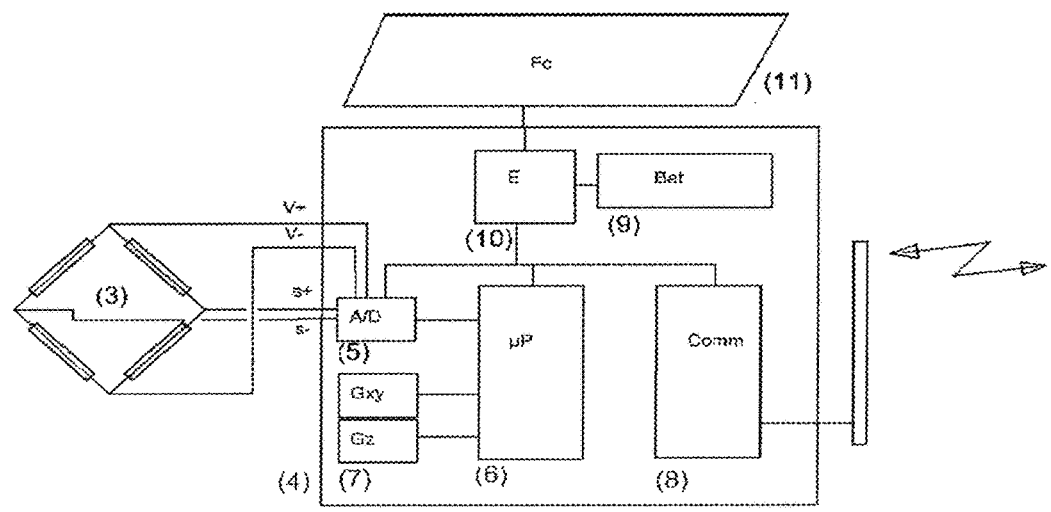
FIG. 4 is a diagram of the electronic components that make up the sensor.

The sensor has a blade (1), as shown in FIG. 3, which is made of metallic material. Strain-gauge strips (2) are mounted on said blade, as shown in FIG. 3, and are connected in the form of a Wheatstone bridge (3), shown in FIG. 4, so that they act as a load cell and are able to measure the forces acting on the blade inside the revolving drum during its dynamic contact with the concrete mix. This strain-gauge bridge is connected to an electronic board (4), as shown in FIG. 4, which by means of an analogue/digital converter (5) shown in FIG. 4 acquires a signal from the bridge and sends it to the microprocessor (6) of the board, shown in FIG. 4, for processing thereof. The electronic board is provided, moreover, with one or more accelerometers (7), as shown in FIG. 4, which enable it to detect variations in speed along the axes XYZ, namely in the three physical dimensions of space. The information supplied by these accelerometers is detected by the microprocessor. The board is provided with a wireless series communications controller (8), shown in FIG. 4, which allows it to transmit or receive the information to other devices or from other devices for subsequent processing thereof. The board has a battery (9), shown in FIG. 4, for supplying electric power to the electronics, and a power controller (10), see FIG. 4, which manages the consumption levels and the power supplied by the photovoltaic cell (11), see FIG. 4, in order to recharge the battery making use of the periods of light. The engineering design is such that the sensor may operate 24 hours a day with at least two hours of solar recharging.

Figure 2:
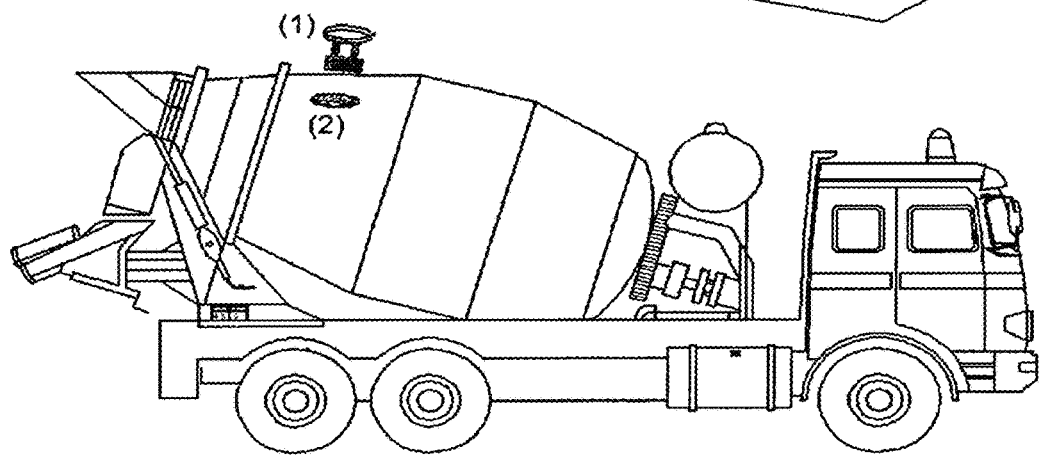
FIG. 2 shows an exploded view in which the sensor is separated from the mixer where it is installed in order to explain how the sensor is placed in the mixer, in this case a concrete mixing transport truck

In accordance with that which can be seen in FIG. 2, in order to install the sensor on the mixer, a simple longitudinal cut is formed, together with boreholes for fixing it as indicated by (2) in FIG. 2, these allowing the sensor blade to be introduced inside the mixer in such a way that the compartment housing the electronics and the antenna remain outside the mixer, while the blade remains inside it. The photovoltaic cell is situated, integral with the sensor housing, on the outside thereof so that, once the sensor has been installed in the mixer, it has access to sunlight. The boreholes which must he formed in the mixer for holding the sensor may he provided with a thread for fixing the sensor by means of screws, although it is more advisable to fix said device using rivets since, apart from being cheaper and easier to fit, it avoids using screws which may come loose due to the vibrations of the lorry. It is necessary to choose suitably the position for forming this cut such that it does not coincide with the inner vanes of the mixer which move the concrete mix. It is also important to choose suitably the longitudinal position of the sensor so that it maintains a maximum range when measuring the volume of the concrete mix. Moreover it is necessary to orient suitably the sensor so that it does not confuse the mixing state with the discharging state. Finally it is mentioned that more than one sensor may be installed if one sensor alone is unable to manage the entire filling range of the drum. It may happen that, depending on where the sensor is installed, only the top part of the filled area or only the bottom part, in some types of mixers is detected. In such cases it is advisable to install a top sensor and a bottom sensor. The wireless communication protocols which are designed for implementation in the sensor microprocessors envisage operation in multi-point and cooperative mode such that they share the information and supply consensual values to the external devices which use said information.

The sensor blade, being situated inside the mixer, is in contact with the concrete mix and when the mixer rotates, upon mixing of the concrete, the blade is subject to flexural forces which are measured by the electronic device by means of deformation of the strain-gauge strips. In this way it is possible to obtain with this device the variables which are of interest for monitoring the concrete mix. These variables are now described:

1. Direction of Rotation of the Revolving Drum

This variable is detected automatically depending on the signal supplied by the blade with reference to the rest position. At rest, the blade will supply a signal of +/− various millivolts. If mixing is being performed, the concrete mix will apply pressure on one side of the blade, while if discharging is taking place, the pressure will be exerted on the blade on the opposite side. In other words, in one case the signal in millivolts will be greater than that in the rest state, while in the other case it will be less. When the sensor is installed in the mixer, the direction will be respected such that the signal is greater during mixing and less during discharging than in the rest state. A mark as indicated by (3) in FIG. 3, or the like, will indicate to the installation engineer which is the correct direction of installation.

Figure 7:
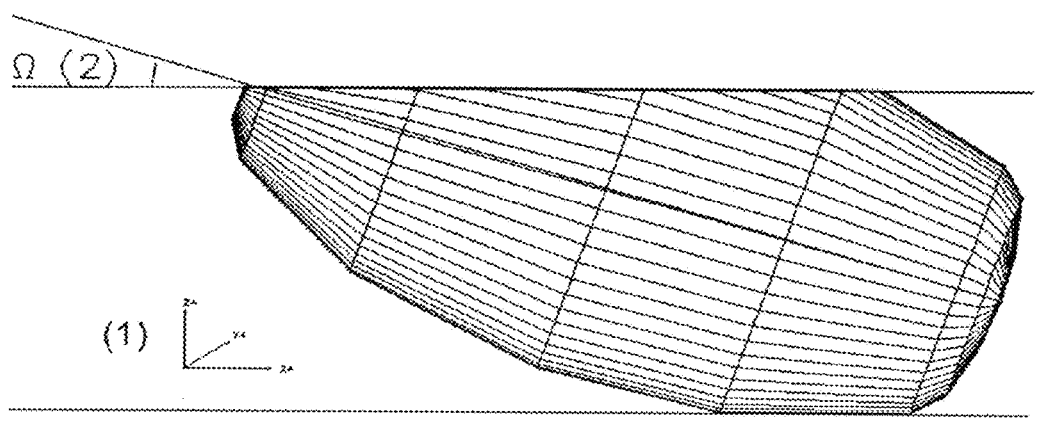
FIG. 7 shows the shape of the conglomerate inside the mixer and the reference axis of reference considered.

The direction of rotation may also be automatically detected using the information supplied by the X, Y and Z axis accelerometers, based on the evolution in the position of the sensor. Using the criterion of coordinates as indicated by (1) in FIG. 7, the evolution of the sensor along the YZ axis indicates a direction of rotation as follows:

In the quadrant 1 of the YZ axes: (Y>=0) and (Z>=0), if Y decreases and Z increases, mixing is being performed. If Y increases and Z decreases, discharging is being performed.

In the quadrant 2 of the YZ axes: (Y<=0) and (Z>=0), if Y decreases and Z decreases, mixing is being performed. If Y increases and Z increases, discharging is being performed.

In the quadrant 3 of the YZ axes: (Y<=0) and (Z<=0), if Y increases and Z decreases, mixing is being performed. If Y decreases and Z increases, discharging is being performed.

In the quadrant 4 of the YZ axes: (Y>=0) and (Z<=0), if when Y increases Z increases, mixing is being performed. If when Y decreases Z decreases, discharging is being performed.

It must be remembered that, if the revolving drum of the lorry is completely empty, the sensor blade will not be subject to the forces applied by the concrete mix since the latter is not present in the lorry and, therefore, via the blade it is not possible to detect whether the revolving drum is rotated in one direction or the other, but only if it is in the empty condition. In this case (revolving drum rotating empty) it is only possible to identify the direction of rotation by means of the accelerometers as explained in the previous paragraph.

This feature has the advantage of providing a method for detecting when the revolving drum of the lorry is completely empty. Obviously, if rotation is detected via the accelerometers and the blade force signal does not vary, this means that the lorry has an empty load of concrete mix.

2. Revolutions of the Revolving Drum

This variable is automatically detected depending on the signal supplied by the blade. When the blade, rotating integrally with the mixer, is at the top of the drum, it will lose contact with the concrete mix, resulting in it no longer being subject to forces. Therefore if the evolution of the signal generated by the blade over time is analysed, it will be seen that cyclically there will be a period of time during which the blade will be subject to forces and another period where it is not, namely when it is situated at die highest vertical levels. If the number of times per minute that there are time periods not subject to force is measured, the revolutions per minute of the revolving drum will be obtained.

The revolutions may also be detected automatically using the information supplied by the accelerometers along the YZ axes, based on the evolution in the position of the sensor. Whenever Z or Y passes through a maximum point or passes through a minimum point, one revolution may be counted.

It must be remembered that, if the revolving drum of the lorry is completely empty, the sensor blade will not he subject to the forces applied by the concrete mix since the latter is not present in the lorry and, therefore, via the blade it will nut be possible to detect at what revolutions the revolving drum is rotating. In this case (revolving drum rotating empty) it is only possible to identify the revolutions by means of the accelerometers as explained in the previous paragraph.

On the other hand, if the lorry is too full, it may happen that the blade does not manage to separate itself from the concrete mix and continues to be subject to forces. Although the force is less at the top, there is no column of concrete mix and although physically there exists a point during rotation when the force is maximum, which is when the blade lifts up the concrete mix from below, it could happen that the device is not sufficiently sensitive to detect these maximum and minimum points. For this reason this method is complemented with the use of accelerometers.

3. Volume of Concrete Mix Transported

Analysing again the force signal of the blade over time, it can be seen that it is a cyclical time signal, as indicated by (4) in FIG. 11, which can be broken down into one part of the rotation during which the blade is subject to force, as indicated by (6) in FIG. 11, and into another part of the rotation where it is not subject to said force, as indicated by 5 in FIG. 11. The greater the percentage of time of this cycle that this signal is subject to force, the fuller will be the mixer lorry.

Figure 8:
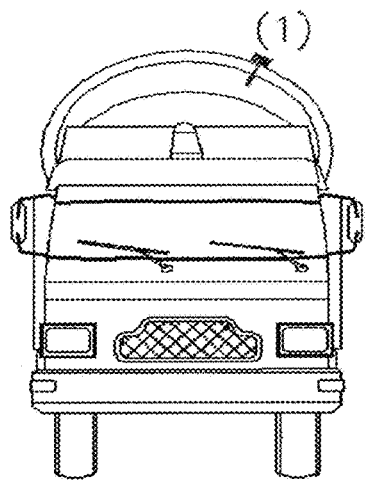
FIG. 8 shows a concrete mixer truck seen front the front, with the sensor installed.
Figure 9:
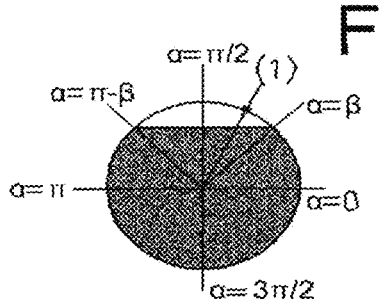
FIG. 9 is a section of the mixer of the truck shown in FIG. 8, with the mixer at rest, in which the level of concrete carried therein is shaded.

FIG. 8 shows a front view of the lorry drum or mixer and at (1) it is possible to see the position of the sensor. FIG. 9 shows a cross-section of said view in the position where the sensor is installed. For the sake of simplification, a circle has been drawn, although the shape is more similar to that of an ellipse. The shaded part represents the volume occupied by the concrete mix. When the drum is no longer rotating because it is stopped, the concrete mix is in the rest condition and it is possible to identify an angle $\beta$ where the sensor no longer makes contact with the concrete mix: this angle ($\beta$) will he called contact angle. On the other hand, in the case of angles greater than $\pi-\beta$, the sensor will again make contact with the concrete mix.

If the mixer were a horizontal cylinder, it would be possible to apply a mathematical formula for calculating the volume depending on the angle detected by the sensor. However, this is not possible since the container is a set of conical shapes electrically welded and inclined with respect to an axis of rotation which is not horizontal, as indicated by (2) in FIG. 7.

Figure 10:
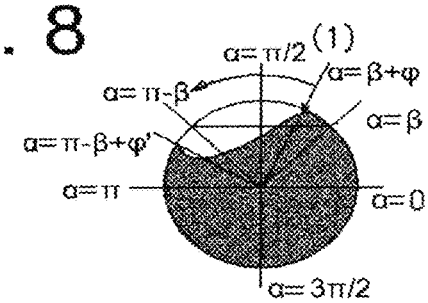
FIG. 10 is a section of the mixer of the truck shown in FIG. 8, with the mixer rotating in the mixing direction, in which the level of concrete carried therein is shaded.

Moreover, since the concrete mix is viscous, when the drum rotates at an angular speed to, "banking" of the concrete occurs, which results in the sensor passing into the no-force zone at the angle $\beta+\phi$ and again starting to detect force at $\pi-\beta+\phi'$, as shown in FIG. 10. In practical terms it can he said that $\phi'=(\phi+\phi')/2$, since this is the information of real interest, since this is the angle which can be detected in reality by the sensor using the information of the set of accelerometers. The angle ($\phi$) will be called banking angle. In actual fact, as can be seen at (2) in FIG. 11, the height of the sensor when rotating integrally with the drum describes a cycloid over time (plotting the time along the axes of the abscissae) and via the accelerometers it is possible to detect the maximum values of the cycloid.

Since, on the one hand, via the accelerometers it is possible to know the angular position of the sensor in the plane ZY at any moment and, on die other hand, via the force acting on the blade it is possible to know the instant when it is passing to the force zone ($\pi-\beta+\phi$) and the instant when it is passing to the no-force zone ($\beta+\phi$), a system of two equations with two unknown quantities is obtained, so that by solving said equation it is possible to deduce $\beta$ and $\phi$:

$A1=\beta+\phi$ $A2=\pi-\beta+\phi$, $A1$ and $A2$ being data, so that we can calculate $\beta$ and $\phi$.

Figure 5:
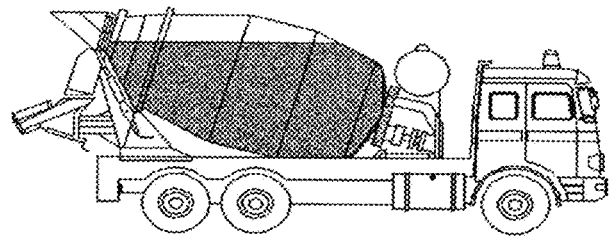
FIG. 5 shows a side section of the mixer loaded with concrete mix, but with the mixer at rest.
Figure 6:
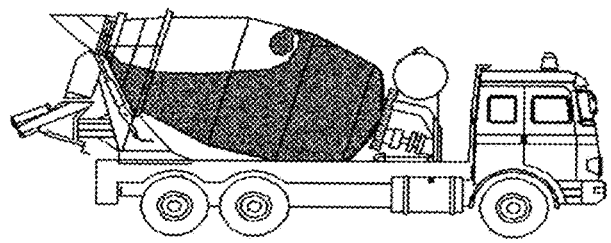
FIG. 6 shows a side section of the mixer loaded with concrete mix, but with the mixer in movement, mixing the concrete mix.

However, this calculation is not so simple, as we shall explain below. FIG. 5 shows a lateral cross-section through the mixer filled with concrete, but with the mixer at rest. FIG. 6 shows the same cross-section, but with the mixer in movement, mixing the concrete. The inner vanes of the mixer move the concrete in the longitudinal direction inwards when mixing is performed and outwards when discharging occurs, so that these movements alter the above calculation.

If, in addition to all of this, the geometrical dimensions of the mixers of each mixer lorry vary, it is not very practical to try to devise a mathematical formula which calculates the volume from the data $\beta$, $\omega$ and $\phi$. For this reason, the means for calculating the volume using them is by means of au algorithm.

What emerges from the present reasoning is that the volume is closely related to $\beta$ and dependent to a certain extent on $\omega$ and $\phi$. As a result, with a suitable algorithm, the sensor is able to provide an objective variable for the volume, depending on the values which it detects which allow it to deduce $\beta$, $\omega$ and $\phi$ beforehand.

4. Plasticity of the Concrete Mix

As already mentioned, a method for deducing the plasticity from the pressure of the hydraulic circuit which must be applied in order to move the revolving drum has already been invented previously. It is sufficient to install one or more pressure sensors in said circuit. However, this method requires that the volume be included in it as external data, since said pressure depends (and greatly) on the quantity of concrete transported.

Likewise, the sensor blade according to the present invention will also be subject to a greater force F as indicated by (3) in FIG. 11, the greater the plasticity, so that both variables may be correlated with each other. The advantage is that with the present invention the volume and the angle $\phi$ are also known. In fact, $\phi$ can be correlated better than F with the plasticity.

5. Automatic Identification of the Lorry

Since the invention presented here has a wireless information transmission means, it is able to implement this function by sending a unique identifier together with the information about the drum via said means. In those locations where automatic identification of the lorry is required, it is sufficient to position receivers which receive this information and process it.

The advantages of this solution compared to those described above are as follows:
 There is no additional cost for the system. Using the same platform to develop the rest of the system's functions, the capacity for automatic identification is achieved by simply sending within each frame a few more bytes relating to the unique identifier associated with each sensor.
 It is reliable and suitable for hostile environments. Systems based on reading the registration number by processing a video signal for optical character recognition are expensive, delicate and very much dependent on the light, clean condition of the lorry and optical devices, and the shape of the lorries, and, being visible, require an additional vandal-proof infrastructure, making them even more expensive.
 Distances equivalent to several tens of meters are possible. With systems based on passive RFID only centimeters are possible. Active RFID based systems, on the other hand, allow greater reading distances, but both the transponders and the readers are expensive.

5. Communication Means

The invention communicates via radio or any other wireless communication means with other devices. Communication may be both point-to-point as well as point-to-multipoint or via network such that a set of devices is able to share information in a wireless local area network environment.

The invention will send to other devices via the wireless communication channel at least the following information:
 1. Sensor identifier. Each sensor will have a unique identifier which distinguishes it from other sensors.
 2. Revolutions per minute at which the revolving drum is rotating.
 3. Direction of rotation of the rotating drum. Mixing or discharging.
 4. Volume of the transported concrete expressed in cubic meters. The smallest unit will be half a cubic meter, this being used when orders are placed.
 5. Plasticity of the concrete mix.
 6. Time mark.

Some devices which communicate with the sensor and the functions and novelties associated therewith are now described:

5.1 Lorry viewer

This is a piece of equipment which has a viewing screen, also called display installed in a visible part of the lorry, or Inside the driver's cab, or externally, which displays dynamically the information generated by the sensor. For this purpose, this device communicates with the sensor by means of the abovementioned wireless communication system and receives from the sensor the information relating to the concrete mix. When the concrete mix is delivered, the viewer may be supervised by the customer, or by any other person concerned, in order to check whether the order requirements in terms of volume and plasticity of the concrete mix have been satisfied. See (4) in FIG. 12 for an example of a possible embodiment.

5.2 On-Board Computer in the Lorry

An on-board computer equipped with GPS device for detecting the position and GPRS, GSM, CDMA, TDMA, radio trunking or other modem communicates with the sensor by means of an analogue communications system to which the sensor has access and receives information therefrom. The on-board computer stores this information in its internal memory in the manner of a data recorder and sends it, depending on how it is configured, periodically, or upon request, to a central server. In this way it is possible to have access to on-line information about the concrete mix in the central offices or in any other location of interest for the business transaction.

On-board computers on mixer lorries are neither a novelty nor form the subject of this patent. They are merely mentioned here as another device which may he connected by means of wireless communication to the present invention. For this purpose it is sufficient to equip the on-board computer with the sensor communication means and implement the sensor communication protocols in the logic of said computer.

5.3 Factory Terminal

This device will detect the presence of the lorry automatically when the lorry enters its coverage area in the vicinity of the factory loading zone. This is possible because the sensor includes a unique identifier among the data which it sends. This identifier may be associated with the registration number of the lorry. This factory terminal will have other wired or wireless communication means for communicating with the concrete production, mixing and metering equipment or other information system which might be required. Through these means it re-transmits all the information which it receives from the sensor to the production system. Since the sensor transmits the plasticity value, the production system may use this variable in the manner of a plasticity meter at the time of production of the concrete mix and make suitable corrections to ensure that this requirement in the order is met. This functional capability, which shall be referred to as "remote plasticity meter", although it is useful for all the manufacturing plants, is of more interest for dry-method plants since wet-method plants usually have wattmeters which act as plasticity meters.

Note: Concrete plants may be of the dry-method type or wet-method type. They are referred to as being of the wet-method type when they have a mixer which mixes the concrete before unloading it into the lorry. This type of plant usually equips the mixers with plasticity meters which provide an indication of this characteristic so that it may be adjusted to the requirements of the order. On the other hand, dry-method plants do not have a mixer, so that they simply discharge the metered quantities for mixing inside the lorry mixer. Since in this case the plant does not have a mixer, nor does it have a plasticity meter, su that it is not possible to measure whether the concrete mix being produced has die plasticity required by the customer.

Another contribution of the factory terminal to the process is that it allows the factory production system to he informed as to whether the lorry is returning there with concrete mix, namely, whether the lorry is not totally empty before it receives the next load. In fact, since it maintains a communication protocol with the sensor, the latter informs it of the existing volume in the drum and this information is re-transmitted by the factory terminal to the production system.

Note: On some occasions it often happens that the lorry may not discharge all of the concrete mix at the customer's site because the customer ordered more than calculated and so there is a surplus. In these cases, the lorry returns the concrete mix inside the drum to the plant. At present the driver informs the plant in such circumstances, giving an approximate idea of the amount of material which remains inside the drum of his lorry. It may happen that this surplus material can be used for another order placed by another customer or that this is not possible. If there is no alternative use for this material, it is discharged in the recycling unit at the plant or, should this not be possible because the plant has no recycling unit, or for whatever other reason, then the only remaining option is to empty the lorry at a waste tip. On the other hand, if the surplus material can be made use of, the production system will fill the lorry adjusting the metered amount to the type and quantity of surplus material, based on the driver's estimates. The advantage offered by the invention presented here is that this operation of filling the lorries which return with surplus material can be detected and performed automatically with greater accuracy since the indication of the volume of the surplus material supplied by the sensor is objective and therefore more reliable than the subjective estimate of the volume provided by the driver. This is important because said subjective element creates more uncertainty as regards the total volume which the lorry may hold once filled, with the problems which may arise with the customer should the lorry have the wrong volume, as already explained in the previous paragraphs.

5.4 Customer Terminal

This is a device which may be fixed or mobile and communicates with the sensor via the abovementioned wireless communications system; it receives the information from the latter and displays it on a screen. In this way the customer is able to check the plasticity and the volume of the concrete mix when this product is received on-site, as indicated by (2) in FIG. 12, which shows the customer giving approval for the arrival of the concrete mix in a lorry. The reference (3) in FIG. 12 shows an amplification of possible use of the terminal being used by the customer indicated by (2) in the same figure.

This equipment may be based on existing electronic devices commonly found on the market to which a wireless communication means similar to that of the sensor has been added, together with an application which performs the function described, or may be based on an electronic application specifically developed for this purpose.

Note: The customer is usually uncertain about the volume being received, unless it can be quantified in cubic meters once laid on-site. For this reason, this device represents a major competitive advantage for the supplier since it is possible to demonstrate to their customers that the correct volume is being delivered. To do so, the supplier may supply, lend or hire out this terminal to their preferred customers so that they have a means for automatically checking the deliveries. This is a novelty which improves the customer service and improves confidence. Moreover, the fact of being able to offer this device in itself will already improve confidence of all the customers as a whole.

The reference number (3) in FIG. 12 illustrates an example of the functional capacity offered by this terminal. When the lorry reaches the customer's site, the sensor installed on the lorry establishes communication with said terminal and sends it the information regarding the concrete mix being transported. The customer is able to read this information on the screen of his terminal. The application installed on this terminal may be interactive. In this case not only does it show the information regarding the order, but it also requests validation from the customer. It is also feasible to implement a means for measuring the degree of satisfaction of the customer both as regards quality of the product delivered and as regards the service provided by the driver of the lorry performing the delivery. This information regarding validation by the customer for the delivery and the degree of satisfaction expressed both for the product received and the service provided by the driver during delivery may be transmitted back to the concrete manufacturer in various ways:

1. By the sensor. Communication between the customer terminal and the sensor is two-way so that the customer terminal transmits the information regarding validation and satisfaction to the sensor and the sensor, upon arriving at the factory, re-transmits it to the manufacturer's information systems via the factory terminal.
2. By any possible digital, GSM, GPRS, TDMA or other telephone system, if the customer terminal is equipped with these communication means.
3. By Internet via the customer's local area network, if it exists, or also via a WiFi network which could be connected to the customer's network via an Internet connection and could be connected to the supplier's network in order to exchange this information.

4. Via the GSM, GPRS, TDMA, CSMA, radio trunking or other channel which the on-board computer installed on the lorry may have, if this option exists.

With this customer terminal it is also possible to implement a mechanism for measuring the degree of satisfaction of the customer both as regards the product delivered to him and as regards the service at the time of delivery. For this purpose the sensor maintains two-way communication with this terminal and said terminal has an application which performs this consultation and sends it to the sensor

DESCRIPTION OF A PREFERRED EMBODIMENT OF THE INVENTION

FIG. 3 shows a possible mechanical embodiment of the present invention. As indicated by (1) in FIG. 3, it consists of a metal blade made of stainless steel. The blade form shown in FIG. 3 is preferred, with the aim of trying to prevent as far as possible the possibility of the concrete mix adhering to the blade. This blade has four strain-gauge strips connected in the form of a Wheatstone bridge as indicated by (3) in FIG. 4. The blade is mounted in a circular metal housing so that the end where the strain-gauge strips are connected remains on the inside, with a level of protection equivalent to IP67 or greater, while the other end where the blade is mounted remains on the outside as shown in FIG. 2.

The bridge formed by the strain-gauge strips is connected to an electronic board which is also installed inside the metal housing, as indicated by (4) in FIG. 3.

The electronic board comprises the following functional units:

1. A microcontroller system with its central processor unit (CPU), arithmetic logic unit (ALU), peripheral input output (PIO), working memory, storage memory, timers and control circuit.
2. At least three analogue/digital converters, one of which for digitalizing the analogue signal generated at the strain-gauge bridge of the blade and the other two for digitalizing the analogue signals of the accelerometers which are described below.
3. An XY-axis accelerometer for detecting acceleration, speed and movement of the sensor along the axes XY.
4. A Z-axis accelerometer for detecting acceleration, speed and movement of the sensor along the axis Z. Although XYZ-axis accelerometers already exist on the market, it is preferred to use those described because they are more common and there are more manufacturers.

The position in which the sensor is installed inside the mixer is important. The metal housing will have a mark indicating the direction and the sense in which the sensor must be installed so that the X axis of the XY accelerometer of the sensor coincides with the longitudinal axis of the lorry, with the mark in the forward direction of movement of the lorry.
5. A short-distance radio wireless series communications system operating at 2.4 GHz with Bluetooth communications protocol or the like, which allows this sensor to communicate with other external devices without a physical cable connection.
6. A set of batteries for supplying electric power to the electronic components of the hoard.
7. An electronic power management unit which rationalizes the use of the power and ensures a longer working life of the battery.
8. A set of photovoltaic cells, to be mounted on the outside of the sensor housing, for capturing power from the sunlight.
9. An electronic unit which allows recharging of the batteries using the energy captured from the sun.
10. The microprocessor system will have a program (firmware) performing the following functions:

Process 1: Real-time loop detection and processing of variables 10.1.1 Reading from the A/D channel 1 the force acting on the blade. Recording the force values over time.

10.1.2 Reading accelerations along the XYZ axes from the A/D channels 2 and 3. Temporal integration in order to deduce the spatial velocity vector. Renewed temporal integration in order to deduce the spatial movement vector. Recording acceleration, velocity and movement values over time.

10.1.3 Deducing the speed and direction of rotation of the revolving drum from the information obtained in 10.1.1.

10.1.4 Deducing the speed and direction of rotation of the revolving drum from the information obtained in 10.1.2.

10.1.5 Reconciling the results from 10.1.3 and 10.1.4 and deducing consensual information as to the speed of rotation of the revolving drum ($\omega$). Using the information from 10.1.4 in order to discard erroneous sample readings taken in 10.1.3 due to inertial movements of the lorry and possible inclination during the journey performed by the latter which may falsify the measurements taken in 10.1.1. The direction of rotation corresponds to the sign of ($\omega$). If ($\omega>0$) the direction is the mixing direction. If ($\omega=0$), the mixer is stopped. If ($\omega<0$), the mixer is discharging. Deducing additional information by means of the analysis of possible discrepancies in the results of 10.1.3 and 10.1.4.

10.1.6 Deducing ($\beta$) and ($\phi$) from the data obtained in 10.1.1 and 10.1.2.

10.1.7 Standardizing ($\omega$), ($\beta$) and ($\phi$) so as to provide indices for accessing a volume table and consistency table. With these indices obtaining the volume (V) of the concrete mix from the table and the plasticity (P) of the concrete mix.

10.1.8 Considering ($\omega$), (V) and (P) obtained in 10.1.7 as a measurement of the values of the sensor over time and storing it in the memory, maintaining a number n of values for each variable. For each new set of values detected, replacing the oldest set with the latest set.

10.1.9 Applying a statistical process to the n samples of the set of values stored over time and calculating their statistical values. As a result it is possible to obtain values for the volume and plasticity of the concrete mix at a moment in time.

10.1.10 Storing and keeping a historical record of the values for volume, plasticity, speed of rotation and direction of rotation over time.

Process 2: Transmission of the Variables Via Wireless Communication 7.2.1 Transmitting periodically a frame with the following information:
  Unique identifier of the sensor
  Time period mark
  Speed of rotation of the revolving drum
  Direction of rotation of the revolving drum
  Volume of concrete mix transported
  Plasticity of the concrete mix Process 3: Command Reception 7.3.1 Monitoring the reception channel in order to identify any customer node in the network which may he sending any commands.

7.3.2 If a command is received, carrying out the command and reporting the status to the customer node. The commands which may be received are:
- Request for sending of current parameters
- Request for sending of stored data
- Request for sending of stored events
- Request for sending of data regarding order transported
- Request for change in parameters
- Request for firmware update
- Indication of sets of values for calibration
- Request for deletion of stored data
- Request for deletion of stored events
- Request for customer satisfaction survey record
- Request for sending of customer survey data Lorry Viewer Design A possible design of the lorry viewer is based on an electronic board which has the following functional units:
1. Microcontroller system with its central processor unit (CPU), arithmetic logic unit (ALU), peripheral input output (PIO), working memory, storage memory, timers and control circuit
2. Bluetooth communications module
3. Illuminated graphic, alphanumeric or LCD display
4. Connector for powering the device using die lorry battery
5. Power source based on a DC-DC converter which adapts the voltage of the lorry battery
6. Housing fur storing all the electronics The microprocessor will have an application (firmware) which receives information from the sensor and displays on the LCD the cubic meterage of the concrete mix transported and its plasticity. In this example of embodiment the equipment indicates the plasticity with reference to the test IRAM 1536 which uses Abrams cone.

Customer Terminal Design

A possible design of the customer terminal is based on the use of a standard electronic device which may be a PDA with a Bluetooth communications protocol. As can he seen in (3) in FIG. 12, this graphics terminal will detect automatically the presence of the lorry, establishing communication with the sensor in order to exchange information. The sensor will send the terminal following data to be displayed on the screen:
1. Customer name. The customer may check that their name is shown here.
2. Product transported. In this example of embodiment the concrete mix considered in this case is concrete. The device (3) in FIG. 12 is informing the customer that the concrete being delivered has a resistance of 175 kg/cm2, plastic consistency and dry particle content with a maximum size of 20.
3. The registration number of the lorry is associated with the unique identifier of the sensor and is sent to the customer terminal.
4. The date and the time of the delivery requested in the order and the actual date and time when the lorry arrived, so that the customer can compare them and check that the delivery is punctual.
5. The volume in cubic meters ordered and the volume measured by the sensor inside the drum, so that the customer is able to check that the volume requested is being delivered. This data is shown in multiples of half a cubic meter, this being the smallest unit of measurement which is applied when calculating orders.
6. The plasticity, in this case expressed in accordance with the test IRAM 1536 which uses Abrams cone.

The customer may validate this delivery via the terminal and, if desired, may also indicate the degree of satisfaction. This may be done at any moment while the lorry is on-site and may also be repeated several times if the customer change opinion. With regard to satisfaction, the terminal makes a distinction between satisfaction in respect of the quality of the product which was delivered to the customer and the service provided; the aim is to evaluate the opinion of the person served by the lorry driver who delivered the concrete, i.e. whether the driver acted professionally and was helpful or not. For this purpose and with the aim of simplifying matters as far as possible so as not to bore the customer, the terminal shows six "emoticons", as can be seen in (3) in FIG. 12 and the customer simply has to select one for the product and another one for the level of service and press OK. This information is then sent to the sensor which downloads it to the next factory terminal which it encounters and associated with the identifier of the order to which this information relates. The factory terminal retransmits this information to the information systems of the concrete manufacturer for processing by them. Obviously their concern is to make sure that this information reaches the commercial department and, if the customer expresses any dissatisfaction, to inform the sales agent responsible for this customer so that he/she can immediately contact them.

A novel system, which allows one to record automatically the degree of satisfaction of customers for each of the deliveries performed by the supplier, both as regards the product and as regards the level of service, has thus been illustrated.

The invention claimed is:

1. A system for monitoring a plasticity and a volume of a mixture being mixed inside a rotatory mixer, wherein the mixture regards to concrete mixes, wherein the volume regards to a cubic capacity of whole said mixture as measured in cubic units, and wherein said system comprises:

a sensor which is installed integrally to said mixer through a simple longitudinal cut and which is fitted with strain-gauge strips which are connected in the form of a Wheatstone bridge, so as to act as a load cell; said bridge is connected to an analog/digital converter by which a cyclical signal is acquired over time as digital information, hereinafter called a force signal (F), and which can be broken down into one part of the rotation during which the sensor is subject to a force and into another part of the rotation where the sensor is not subject to said force;

one or more accelerometers operating in the three spatial dimensions or XYZ axes, by which an angular position and an angular velocity ($\omega$) of the system is identified at any instant, which includes identifying an angular position of the system at an instant in which the sensor no longer makes contact with the mixture when said mixture is in a rest condition, hereinafter called contact angle ($\beta$), and an angular position of the system at an instant in which the sensor no longer makes contact with the mixture during mixing at an angular velocity ($\omega$), hereinafter called banking angle ($\phi$);

said system autonomously detects the volume of said mixture, from its correlations with the contact angle ($\beta$) and a percentage of a cycle in said force signal (F) subject to said force, and the plasticity of said mixture, from its correlations with the force signal (F) and the banking angle ($\phi$), over time during an interaction of the sensor with all layers of said mixture; and wherein said system further comprises a short-distance wireless series communication controller by which said system transmits resulting digital information of the volume of said mixture, the plasticity of said mixture, and an unique identifier of said sensor, to other devices, enabling precise corrections in said mixture to be made until specific requirements of said plasticity and said volume are detected by said system.

2. The system according to claim 1, wherein the system further detects a revolution of the sensor along the YZ axes whenever Z or Y passes through a maximum point or passes through a minimum point.

3. The system according to claim 2, wherein the system further detects that the mixer contains no mixture when it is detected via the accelerometer or accelerometers that it is rotating, but there is no significant variation in a force acting on the sensor.

4. A method for a system according to claim 2, said method recording, using a microprocessor, the contact angle ($\beta$) and the banking angle ($\phi$) as digital variables.

5. A method for a system according to claim 2, said method deducing, using a microprocessor, the volume of said mixture and the plasticity of said mixture as digital variables based on the contact angle ($\beta$) and the banking angle ($\phi$).

6. A non-transitory computer readable medium containing an algorithm stored therein for causing a computer processor to perform for a system according to claim 2, wherein the algorithm calculates the contact angle ($\beta$) and the banking angle ($\phi$) of the sensor with the mixture by continuously acquiring a reading from an analog/digital converter that is analyzing a signal of a Wheatstone bridge, which is proportional to a force acting on the sensor, over time to obtain digital information of each reading, and correlating said information with the evolution in the angular position of the sensor in a plane YZ obtained from signals supplied by a number of accelerometers available to die sensor, and filters die readings and assigns them to time instants, obtaining a table of force values over time of size "n";

wherein for each new reading, the oldest value is discarded and the latest one is stored, and in turn, a spatial position xyz supplied by the accelerometers is stored in another table;

using all these sample readings taken at preassigned time instants, it is determined when there is a significant drop in the signal for die force applied to the sensor (loss of contact of the sensor with the concrete mix) and when there is a renewed increase in the force (renewed contact of the sensor with the concrete mix), the algorithm is described in more detail below:

assuming "i" is an instant for detecting values on an ND channel and on the accelerometers, occurring every "mi" milliseconds;

assuming "t" is a sampling time occurring every "mt" milliseconds;

assuming "m" is the number of readings taken for each sampling time so that mt=mi×m;

assuming "n" is the number of sample values stored in a memory;

then:

for a calculation period p, an angular velocity ($\omega$) at which the rotatory mixer is rotating is calculated, characterized in that it calculates the revolutions and the direction of rotation of a mixer by analyzing the force signal over time acting on the sensor, based on determining its periodicity over time, and the force values with respect to a reference value for the force in the rest condition;

depending on the value of the angular velocity ($\omega$), mi, m and n are suitably defined so as to record historical information for various revolutions of the mixer:

mi=Pmi($\omega$)

m=Dm($\omega$)

n=Dn($\omega$)

where Pmi($\omega$) is a function which determines a sampling period depending on the value of $\omega$, and Dm($\omega$) and Dn($\omega$) are functions which define m and n depending on the value of $\omega$;

a memory in the system is allocated depending on m and n;

for each time period "mi" the value of the ND channel and die accelerometers for the instant "i" is detected:

f=force acting on the sensor, via the A/D channel connected to the strain-gauge strips;

xyz=spatial position xyz of the set of accelerometers (there may be one or more accelerometers in die system), deducing this position with respect to a reference point, depending on the spatial acceleration which has occurred in a time period "ini";

sample values for the force and position at the instant "i" are stored in the tables for the force sample values MI-'QJ and position sample values MP[i]:

MF[i]=f

MP[i]=xyz i=i+1

If i equals m, then i=0 for each time period "mt", the sample readings for the time instant t are taken, applying a software filter, and a statistical value for the force in the period t and the position xyz in the period t is obtained, using the sample values m of f and xyz previously stored;

Ft=SamplesFilterF(MF)

Ft=SamplesFilterP(MP)

and they are stored in the force sample values table TMF[t] and in the position sample values table TMP[t];

TMF[t]=Ft

TMP[t]=Pt t=t+1

If t equals n, then t=0 the gradient is applied to the values in the table TMF, obtaining the gradients table gTMF;

gTMF=grad(TMF)

the indices of minimum and maximum values of gTMF are obtained:

iMin[i]=MinV(gTMF)

iMax[i]=MaxV(gTMF)

then position table TMP is accessed with these indices in order to obtain the co-ordinates of y and z in these instants;

and for each of them:

xyz=TMP[iMin]

yMin=CoY(xyz)

zMin=CoZ(xyz)

xyz=TMP[iMax]

yMax=CoY(xyz)

zMax=CoZ(xyz)

then, for each pair of minimum force values of z and y and consecutive pair of maximum force values;

$\beta+\phi$=tangentarc(zMin/yMin)

$\pi+\beta+\phi$=tangentarc(zMax/yMax)

so that by solving these system of two equations with two unknown variables, a sample value of the contact angle $\beta$ and another sample value of the banking angle $\phi$ are obtained;

and as there also exist longitudinal forces forwards during mixing and backwards during discharging and associated inertial forces due to dynamics of the moving lorry, applying statistical process to each pair ($\beta$, $\phi$) in order to discard values which have been falsified by said movements, applying-sampling theory and thus obtaining-definitive values.

7. A non-transitory computer readable medium containing an algorithm stored therein for causing a computer processor to perform for a system according to claim 2, wherein the algorithm calculates the volume of mixture present in the mixer based on the correlation which exists between that volume and the angular velocity ($\omega$) at which the mixer rotates, the contact angle ($\beta$) and the banking angle ($\phi$); for this purpose the algorithm involves calculating firstly the angular velocity ($\omega$), characterized in that calculates a revolution and a direction of rotation of a mixer by analyzing the force signal over time acquired on the sensor, based on determining its periodicity over time, and force values with respect to a reference value for force in the rest condition and then calculating the contact angle ($\beta$) and the banking angle ($\phi$), then segmenting values obtained for ($\omega$), ($\beta$) and ($\phi$) so as to classify them in value ranges and, using at least some of these ranges, accessing a table programmed in a memory or in a database which may exist in a computer where the algorithm is performed or in any other server equipment accessed to obtain this information and in this way obtain the volume of die concrete mix.

8. A non-transitory computer readable medium containing an algorithm stored therein for causing a computer processor to perform for a system according to claim 2, wherein the algorithm calculates the plasticity of the mixture existing in the mixer, based on the correlation which exists between that plasticity and angular velocity ($\omega$) at which the mixer rotates, the contact angle ($\beta$) and the banking angle ($\phi$); for this purpose the algorithm involves calculating firstly the angular velocity ($\omega$), characterized in that it calculates a revolution and a direction of rotation of a mixer by analyzing the force signal over time acquired on the sensor, based on determining its periodicity over time, and force values with respect to a reference value for force in the rest condition and then calculating the contact angle ($\beta$), characterized in that it can deduce the volume of concrete mix transported and its plasticity based on be identification of the contact angle and banking angle as intermediate variables said angles being able to be automatically calculated, and then calculating the banking angle ($\phi$), then segmenting values obtained for ($\omega$), ($\beta$) and ($\phi$) so as to classify them in value ranges and, using at least some of these ranges, accessing a table using them as indices, in order to obtain from said table a tabulated plasticity value, said table being able to be programmed in a memory or in a database of a computer where the algorithm is performed or in any other server equipment to which the processor may be connected in order to access said table.

9. The system according to claim 2, wherein said system transmits via the short-distance wireless series communications controller without a physical connection digital information relating to a direction of rotation of the mixer of a mixer lorry to other devices which are installed in the associated lorry or on an outside thereof.

10. The system according to claim 2, wherein said system transmits via the short-distance wireless series communications controller without a physical connection digital information relating to a speed at which the mixer of a mixer lorry is rotating to other devices which are installed in the associated lorry or on an outside thereof.

11. The system according to claim 2, wherein said system transmits via the short-distance wireless series communications controller without a physical connection digital information relating to the volume of mixture which a mixer lorry is transporting to other devices which are installed in the associated lorry or on an outside thereof.

12. The system according to claim 2, wherein said system transmits via the short-distance wireless series communications controller without a physical connection digital information relating to the plasticity of the mixture present in the mixer of a mixer lorry to other devices which are installed in the associated lorry or on an outside thereof.

13. The system according to claim 2, wherein said system transmits via the short-distance wireless series communications controller without a physical connection digital information relating to the unique identifier of said sensor to other devices which are installed in the associated lorry or on an outside thereof.

14. The system according to claim 2, providing a wireless communication for measuring the plasticity, called a "digital remote plasticity meter", fur transmitting digital information relating to the plasticity via the short-distance wireless series communication controller to equipment for metering and producing the concrete mix via a factory terminal; for this purpose said system transmits an information to the factory terminal which in turn re-transmits said information by wired or wireless links to the metering equipment at the factory where said information is displayed, providing it with a remote measurement of the plasticity.

15. A lorry viewer system, in which, in combination with the system according to claim 2, said lorry viewer system is installed in a visible part of the lorry and allows a customer receiving the mixture transported by a lorry to check an information of the volume of the mixture existing inside a drum thereof, by observing a screen on which said information is displayed.

16. The system according to claim 15, wherein said system allows a customer receiving the concrete mix transported by a lorry to check an information of the plasticity of the mixture existing inside a drum thereof.

17. A factory terminal system providing, in combination with die system according to claim 2, a metering and production system with a telematic measurement of the plasticity of the mixture via a wireless connection to the short-distance wireless series communications controller, during the course of manufacture, improving a production process by ensuring an appropriate plasticity of the mixture which is being manufactured at that moment.

18. The system according to claim 17 providing automatic detection of a quantity of mixture which a lorry is returning to a plant and communication of information related thereto, via a wired or wireless communications port to a metering and production system, so that said information may be taken into account for a next load to be prepared for said lorry.

19. A customer terminal system, providing, in combination with the system according to claim 2, a customer with an interactive information-processing system for telematically checking the volume of the mixture which is being delivered and its plasticity wherein it provides to said customer said interactive information-processing system for telematically providing a level of satisfaction regarding said delivery, said customer terminal system is based on either a custom electronic design, based on a short-distance wireless communications controller, or in the use of a standard wireless electronic device as a Smartphone or a PDA, property of said customer, and which provides said interactive information-processing system.

20. The system according to claim 19, wherein said system automatically and telematically measures a level of satisfaction of a customer with regard to a quality of a product which is being delivered to the customer.

21. The system according to claim 19, wherein said system automatically and telematically measures a level of satisfaction of a customer with regard to a quality of service provided by a driver of a lorry delivering the mixture to the customer.

22. The system according to claim 19, wherein a customer is requested to accept automatically and telematically the mixture which is being supplied to the customer.

23. A method for a system according to claim 1, said method autonomously recording at any moment, using a microprocessor, a revolution and a direction of rotation of the sensor as digital variables by analyzing the force signal acquired on the sensor, based on determining its periodicity over time, and the force signal values with respect to a reference value for the force signal in the rest condition.

* * * * *